United States Patent [19]

Engelhardt et al.

[11] Patent Number: 4,463,165
[45] Date of Patent: Jul. 31, 1984

[54] WATER-DISPERSIBLE POLYESTER, ITS PREPARATION, AND ITS USE AS A HYDROPHILING AGENT

[75] Inventors: Friedrich Engelhardt; Karl Hintermeier, both of Frankfurt; Otto Smerz, Kelkheim; Hans Wagener, Hofheim, all of Fed. Rep. of Germany

[73] Assignee: Cassella Aktiengesellschaft, Frankfurt am Main, Fed. Rep. of Germany

[21] Appl. No.: 549,763

[22] Filed: Nov. 8, 1983

[30] Foreign Application Priority Data

Nov. 27, 1982 [DE] Fed. Rep. of Germany ....... 3244011

[51] Int. Cl.³ .............................................. C08G 63/16
[52] U.S. Cl. .................................. 528/301; 8/115.5; 252/8.6; 252/8.9; 427/389.9; 427/393.1; 427/393.4; 524/604; 524/605; 528/302
[58] Field of Search ................ 528/301, 302; 524/604, 524/605; 8/115.5; 427/393.1, 393.4, 389.9; 252/8.6, 8.9

[56] References Cited

U.S. PATENT DOCUMENTS

| | | | |
|---|---|---|---|
| 3,437,618 | 4/1969 | Taft | 528/302 X |
| 3,542,737 | 11/1970 | Keck et al. | 528/302 |
| 3,853,820 | 12/1974 | Vachon | 528/302 X |
| 4,124,571 | 11/1978 | Georgoudis | 528/302 X |
| 4,276,388 | 6/1981 | Iwami et al. | 528/301 X |
| 4,341,669 | 7/1982 | Marco et al. | 427/393.1 X |
| 4,363,908 | 12/1982 | Joyner et al. | 528/302 |

Primary Examiner—Lucille M. Phynes
Attorney, Agent, or Firm—Connolly and Hutz

[57] ABSTRACT

Hydrophobic textile materials exhibit reduced tendency to static charge buildup, significantly improved absorbency and reduced soiling tendency when treated with a water-dispersible polyester having structural units of the formula

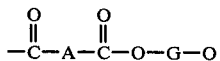

wherein A is, on statistical average, 80 to 100 mol percent of p-phenylene and 0 to 20 mol percent of divalent moieties of the formula

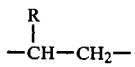

and wherein G is, on statistical average, 30 to 90 mol percent of linear or branched divalent alkane moieties having 3 to 6 carbon atoms which may be interrupted by 1 or 2 oxygen atoms, 10 to 30 mol percent of divalent polyether moieties having an average molecular weight of 1,000 to 3,000, and up to 50 mol percent of ethylene moieties, and R is a straight-chain or branched alkyl or alkenyl having 6 to 8 carbon atoms.

14 Claims, No Drawings

WATER-DISPERSIBLE POLYESTER, ITS PREPARATION, AND ITS USE AS A HYDROPHILING AGENT

The present invention relates to a water-dispersible polyester composed of building groups of the formula

—CO—A—CO—O—G—O— wherein A predominantly denotes p-phenylene and G predominantly denotes divalent radicals of alkanes having 3 to 6 C atoms, to its preparation, and to its use in improving the application properties of hydrophobic fibre materials.

ICI's British Pat. No. 1,088,984 discloses water-dispersible polyesters which are obtained by modifying polyethylene terephthalate by means of hydrophilic components and are used for aftertreating polyester articles. This patent also encompasses the treated fibre as a whole and a thermal treatment at temperatures above 90° C. The essential, patent-determining feature is said to be that the predominantly linear polyesters used for the treatment have to contain longer or shorter polyethylene terephthalate segments, i.e. segments which are chemically identical to the fibre to be treated, so that a "co-crystallisation" becomes possible, something which is considered necessary for adequate heat-setting.

Aftertreatment agents which are specifically used for antistatic finishing, i.e. for reducing the electrical surface resistance of hydrophobic fibre materials, and the majority of which are based on salt-like organic ammonium compounds have likewise already been proposed in large numbers. A monograph by K. Lindner, "Tenside—Textilhilfsmittel—Waschrohstoffe" ("Surfactants—Textile Auxiliaries—Detergent Bases"), Wissenschaftliche Verlagsgesellschaft mbH Stuttgart (1971), pages 2,592-2,599, provides a survey of these aftertreatment agents. Despite this large number of suggestions only a few commercial products have come on the market. Special soil-release auxiliaries, preferably based on fluorinated organic compounds, have also already been disclosed.

These disclosed compounds, however, still have disadvantages which can be considerable in some cases. For instance, the agents used specifically as antistats are not yet wash-fast enough, and the fluorine-containing soil-release agents can lead to disadvantages in respect of the surface conductivity.

These known agents have further deficiencies in their application properties, for example in changing the handle, in water absorbency, in soiling or in an insufficient or all too one-sided action.

It was found then, surprisingly, that hydrophiling agents which, compared with known, commercially available agents, give improved effects, inter alia in respect of antistatic properties, absorbency, soil redeposition or even permanence to washing are obtained when terephthalic acid or a suitable terephthalic acid derivative is reacted with a diol mixture to which have been added, in addition to ethylene glycol, more than 50 mol% of higher diols ($C_3$-$C_6$ diols), relative to the total monomeric diol content, and into which so much polyethylene glycol (PEG) has been incorporated by condensation reaction that there are enough hydrophilic ether groups to render the polyester emulsifiable.

The present invention thus relates to a new water-dispersible polyester which is composed of building groups of the formula

—CO—A—CO—O—G—O—  (I)

where

A denotes, on statistical average, to 80 to 100 mol% p-phenylene and to 0 to 20 mol% divalent radicals of the formula II $$-\overset{\overset{\displaystyle R}{|}}{C}H-CH_2-\quad\quad (II)$$

G denotes, on statistical average, to 30 to 90 mol% linear or branched divalent alkane radicals having 3 to 6 C atoms which may be interrupted by 1 or 2 oxygen atoms, to 10 to 30 mol% divalent polyether radicals having an average molecular weight of 1,000 to 3,000, and to 0 to 50 mol% ethylene radicals, and R represents a straight-chain or branched alkyl radical or alkenyl radical having 6 to 18 C atoms.

The divalent polyether radicals standing for G are derived from polyalkylene glycols having 2 to 4 carbon atoms in the alkylene units, such as polyethyleneglycol, polypropyleneglycol, polybutyleneglycol and/or polyethylene-polypropyleneglycol. Preferred divalent polyether radicals are derived from polyethyleneglycol.

For the purposes of the present invention, the specifications in mol%, unless expressly stated otherwise, relate to the total amount of dicarboxylic acid component, which is set equal to 100.

The polyesters of the invention predominantly terminate in diol radicals and are consequently assigned to the general formula HOGO—(—CO—A—CO—O—G—O)$_n$—H where G and A have the abovementioned meanings and n takes such a value as to make the average molecular weight 1,000 to 3,000.

In preferred polyesters of the invention,

A denotes, on statistical average, to 80 to 97 mol% p-phenylene and to 3 to 20 mol% divalent radicals of the formula II $$-\overset{\overset{\displaystyle R}{|}}{C}H-CH_2-\quad\quad (II)$$

and

G denotes, on statistical average, to 50 to 70 mol% linear or branched divalent alkane radicals having 3 to 6 C atoms which may be interrupted by 1 or 2 oxygen atoms, to 10 to 30 mol% divalent polyether radicals having an average molecular weight of 1,000 to 3,000, and to 20 to 40 mol% ethylene radicals.

Those polyesters of the invention are also preferred in which A denotes, on statistical average, to 4-10 mol% divalent radicals of the formula II, because of their particularly good wash fastness also those in which G represents a straight-chain divalent radical of an alkane having 3 to 6 C atoms, and also those in which R represents a branched alkyl or alkenyl radical.

Preferred polyesters of the invention also include those in which R is an alkenyl radical having 6 to 18 C atoms.

Those polyesters of the invention are particularly preferred which have more than one preferred feature.

The apparent mean molecular weight of polyesters of the invention is preferably 1,000–2,000, in particular 1,200–1,600. The poly coesters with molecular weights of up to about 1,600 are more easily dispersed than those having a higher molecular weight. Even so, the latter group can likewise be converted, if need be, by means of a dispersant, into very fine perfectly stable emulsions or suspensions. The apparent mean molecular weight is determined in a vapour pressure osmometer using dimethylformamide as solvent (cf. Shouji Kume and Haruo Kobayashi: Molecular Weight Measurement by Vapor Pressure Osmometer, in "Die Makromolekulare Chemie" volume 79 (1964) pages 1–7). Because the few free carboxyl groups dissociate, the actual mean molecular weight is slightly higher than the apparent value measured by this method. Yet the measured value is a sufficiently accurate criterion for characterising the degree of condensation of the poly coesters of the invention and for determining the endpoint of the polycondensation reaction.

The polyesters of the invention are prepared in a manner known per se by reacting with one another
80–100 mol%, preferably 80–97 mol%, of terephthalic acid or of a suitable terephthalic acid derivative,
0–20 mol%, preferably 3–20 mol%, of an alkylsuccinic or alkenylsuccinic acid of the formula III

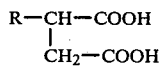   (III)

wherein R has the meaning specified in claim 1, or of a suitable derivative, with
30–90 mol%, preferably 50–70 mol%, of a linear or branched alkanediol having 3 to 6 C atoms which may be interrupted by 1 or 2 oxygen atoms, 10–30 mol% of a polyethylene glycol having a mean molecular weight of 1,000 to 3,000 and, if appropriate,
0–50 mol%, preferably 20–40 mol%, of ethylene glycol, in a manner known per se, at temperatures of 100°–280° C., preferably 150°–230° C.

Furthermore, preferred polyesters of the invention are also obtained by reacting 4–10 mol% of the alkylsuccinic or alkenylsuccinic acid of the formula III.

In particular, preferred polyesters of the invention are obtained when such alkenylsuccinic acids are used as the succinic acid derivative of the formula III as are obtained in the wellknown reaction of olefines having 6–18 C atoms with maleic acid or maleic anhydride in a molar ratio of 1:1 or in the reaction of olefines having fewer than 6 C atoms with maleic acid or maleic anhydride in a molar ratio which is higher than 1:1 in respect of the olefine. For instance, excellent polyesters of the invention are obtained by using as the succinic acid derivative of the formula III or of the formula IV shown below, 2,4-dimethylheptenylsuccinic acid or its anhydride, which, as is known, can be prepared by reacting 1 mol of maleic acid or maleic anhydride with 3 mols of propylene.

For the purposes of the present invention "reacting with one another" means that the reactants really are incorporated into a polyester molecule and do not, as it were, escape the reaction by evaporating or subliming. If the reaction is carried out without an excess of the volatile abovementioned diol components, the apparatus should be designed in such a (known) way, for example by attaching an efficient separating column, as to ensure that only water formed in the course of the reaction can escape from the reaction zone.

Terephthalic acid derivatives suitable for the purposes of the present invention are those which, according to the state of the art, can be used for preparing esters, such as dialkyl esters having 1 to 4 C atoms per alkyl radical. The same holds for the alkylsuccinic and alkenylsuccinic acids of the formula III; in the case of these acids the anhydrides are also very suitable.

Examples of suitable esters, and anhydrides are the dimethyl, diethyl, di-n-propyl, diisopropyl, di-n-butyl and diisobutyl esters of terephthalic acid and of the alkylsuccinic and alkenylsuccinic acids of the formula III and the alkylsuccinic and alkenylsuccinic anhydrides of the formula IV

   (IV)

wherein R has the abovementioned meaning.

Examples of R radicals which can be present in the alkylsuccinic or alkenylsuccinic acid to be incorporated by condensation in accordance with the invention or a suitable derivative thereof are hex-1-yl, hex-2-yl, hex-3-yl, isohexyl, heptyl, isoheptyl, oct-1-yl, oct-2-yl, oct-3-yl, oct-4-yl, isooctyl, 2-ethylhex-1-yl, nonyl, isononyl, 2,4-dimethylhept-1-yl, decyl, dodecyl, lauryl, palmityl, stearyl, hexenyl, isohexenyl, heptenyl, methylheptenyl, 2,4-dimethylheptenyl, (="Tripropenyl"), octenyl, isooctenyl, 2-ethylhexenyl, nonenyl, decenyl, dodecenyl, trimethylnonenyl, oleyl and octadecenyl.

In practice, an excess of diol is used to improve the equilibrium position in accordance with the law of mass action and, in particular, to increase the rate of reaction, but also to improve the starting consistency, namely by using, as a rule, 150–300 mol%, preferably 150–250 mol%, of total diols per 100 mol% of total dicarboxylic acids—the excess being used in particular in the case of alkanediols having 3–6 C atoms and in the case of ethylene glycol, while the high-boiling polyethylene glycols are generally not used in excess.

Examples of suitable alkanediols having 3–6 C atoms are propane-1,2-diol, propane-1,3-diol, butanediols, such as butane-1,2-, -1,3- and, in particular, -1,4-diols, or 2-methylpropane-1,3-diol, pentanediols, such as pentane-1,5-diol, neopentylglycol, and hexanediols, in particular hexane-1,6-diol.

The reaction between the dicarboxylic acids and the diols proceeds via the elimination of water. If instead of free dicarboxylic acids their lower alkyl esters having 1 to 4 C atoms in the alkyl radicals are used, the reaction eliminates the corresponding lower alkanols. If anhydrides of the alkylsuccinic or alkenylsuccinic acids of the formula III are used, their ring opens to incorporate the dicarboxylic acid radicals II. The reaction between the starting components is referred to below, in line with common parlance, as a condensation reaction.

The preparation of the polyester of the invention by condensing the starting components is, as is customary, carried out at elevated temperatures of 100° to 280° C., in particular 150° to 230° C., preferably under an inert gas atmosphere, such as under nitrogen or carbon dioxide, and/or under reduced pressure and, preferably, with stirring, and the volatile condensation products (water and/or alcohols) and any excess starting components, usually a diol, are distilled off. If atmospheric pressure is used, it can be advantageous to apply towards the end of the condensation a vacuum of, for example, 10 to 30 mbar, followed, if necessary, by a vacuum of about 1 to 3 mbar or, if necessary, even lower to remove the volatile products. The condensation normally takes 3 to 20 hours and is continued until the desired apparent mean molecular weight of 1,000 to 3,000, preferably 1,000 to 2,000, has been reached. The starting materials used for the condensation can first be all mixed together and then jointly condensed. The result of proceeding in this way is that the product contains the components in random distribution. However, the products of the invention can also be obtained by, first, precondensing only some of the starting materials and subsequently condensing the remainder in any order and at any interval with the precondensate. Ignoring ever possible transesterifications, it is possible in this way to prepare, from the same starting materials, products which differ in the distribution of the individual components and which can be varied, within certain limits, even in their application properties. Substrate-specifically optimised application properties can be obtained in a particularly simple manner by controlling the length of time for which the condensation is carried out, i.e. by means of products with different molecular weights.

The polycondensation reaction can be carried out with or without customary esterification or transesterification catalysts. The two possibilities—with or without—can have special advantages in a particular case, since the choice of options allows the properties of the products to be varied within certain limits without otherwise changing the way the reaction is carried out. For example, the esterification or transesterification catalysts used can be alkali metal hydroxides, such as sodium hydroxide or potassium hydroxide, or alkali metal alcoholates, such as sodium methylate or sodium ethylate, alkaline earth metal oxides or alkaline earth metal hydroxides, such as the corresponding calcium or magnesium compounds, and also zinc oxide, cadmium oxide, antimony oxide, salts of organic carboxylic acids, such as the sodium, calcium, manganese or zinc salts of acetic or formic acid, and organic titanium compounds, in particular the titanium alcoholates, such as titanium isopropylate or titanium butylate, and the like. The amounts to be used depend mainly on the effectiveness of the particular catalyst. The amount of catalyst is normally kept as low as possible. Acid catalysts are not much use since they convert any glycol or diethylene glycol which may have been used into dioxane and hence largely withdraw it from the chain-forming reactions.

The polyesters of the invention can be dispersed in a manner known per se, namely with or without the addition of a dispersant. The particular characteristic of these dispersions resides in the fact that they, prepared from the hot melt, are at first emulsions but later, on cooling, solidify into suspensions. If the dispersions are prepared from the cooled melt, suspensions are obtained immediately. The dispersions of polyesters of the invention are preferably prepared without employing dispersants, by (a) stirring water into the hot melt, a highly viscous phase being passed through, or (b) technically simpler, stirring the hot melt into water. Provided this stirring is performed by sufficiently intense mixing, for example by means of an Ultra-Turrax stirrer (10,000 r.p.m.) or, better, with ultrasonic equipment (20,000 Hz) it is possible to obtain directly systems which are stable and highly dispersed and have a particle size of about 1µ. It should be appreciated that, owing to their high content of incorporated polyethylene glycol (usually above 50% by weight of the total solid substance!), these polyesters, when in an aqueous emulsion, display the well-known cloud point at temperatures above 60° C. and show signs of creaming. It is therefore necessary to prepare the dispersions at below 50° C. or to cool them down to below 50° C., while mixing thoroughly, before they can be stored. It can also be advantageous for the stability of the dispersions to add a little base to neutralise the naturally weakly acid dispersions; or (c) initially stirring the solidified polyester in coarsely grained form or in the form of lumps at 10°–50° C., preferably at 15°–40° C., in particular at room temperature, in water for some hours, during which it disintegrates into a fine sludge. This sludge is then poured into a suitable vessel, where it is washed with more water and at the same time adjusted to the desired final concentration. This fine sludge is then milled with glass balls, preferably with those having a diameter of about 0.5 cm, or sandmilled in a suitable sandmill until at least 95% of the particles have attained a diameter of about 1µ (inspection under the microscope). The dispersions prepared in this way show no sign of gelling or sedimenting even on storage at 50° C.

The method (c) will always produce perfect dispersions. In cases where the methods (a) and (b) are unsuccessful, these dispersions can simply likewise be subsequently ground until the required state of fine division has been reached. The amount of water is chosen to produce 5–33⅓% by weight strength, preferably 10–25% by weight strength, dispersions.

If in particular cases it is nevertheless desired to prepare dispersions by adding a dispersant, it is advantageously admixed to the melt right at the end of the polycondensation. It is also possible, however, and has virtually the same end result, to add the dispersant to the water or to introduce it into the dispersion at any other time.

The dispersants used can be the generally known nonionic products which are essentially based on oxyalkylation products of OH-containing organic compounds. Examples of such suitable dispersants are oxyethylated benzylhydroxydiphenyl, preferably having about 12 ethylene oxide units, oxyethylated 2,4,6-tris-tert.-butylphenol or 4-nonylphenol, preferably having about 6 ethylene oxide units.

The polyesters of the invention, and preferably their dispersions, are used for treating textile materials, such as filaments, yarns or textile sheet-like structures, which are wholly or partly made of hydrophobic synthetic fibres.

For the purposes of this invention, hydrophobic fibres are fibres made of polyesters, in particular polyethylene terephthalate, polyamides and polyacrylonitrile and those made of the corresponding chemically modified polymers.

Said textile materials are treated by applying the polyesters of the invention, preferably in the form of the dispersions described, to the textile materials in a manner known per se and fixing them thereon, after the customary drying, by means of a heat treatment. The polyesters or their dispersions are applied in a manner known per se, for example by the exhaust method, by pad-mangling or by spraying.

The polyesters of the invention, preferably in the form of the dispersions, are applied at a level of 0.3 to 1.5% by weight, preferably 0.6 to 1.2% by weight, relative to the weight of the substrate. The dispersions of the polyesters of the invention, which generally have a polyester content of 5 to 33⅓% by weight, preferably 10 to 25% by weight, are correspondingly applied to the textile materials in an amount of 0.9 to 30% by weight, preferably 2.4 to 12% by weight, relative to the weight of the substrate.

The filaments, yarns or textile sheet-like structures treated with the polycoesters of the invention and predominantly made of PES, PA, PAC and their mixtures with cellulosic fibres, have a markedly reduced tendency to build up static charge and significantly improved water uptake (absorbency). The treatment of the invention also considerably reduces the wet soiling (or soil redeposition) tendency and also the dry soiling tendency. Mechanically applied dirt, such as oils and fats, can be removed significantly more easily from materials which have been treated with the poly coesters of the invention (soil release effect). The effects obtained are highly permanent to washing and dry-cleaning, the more so the more and the longer alkyl radicals are present in the diol components and alkyl or alkenyl radicals in the succinic acid components and the higher the molecular weight of the polyester. The handle of the textiles treated is not affected adversely.

The following examples illustrate how the polyesters of the invention and dispersions thereof are prepared and how they are used.

EXAMPLE 1

94 mol% of DMT; 6 mol% of 2,4-dimethylheptenyl-succinic anhydride ("tripropenylsuccinic anhydride"); 90 mol% of monoethylene glycol; 110 mol% of butane-1,4-diol; and 27.3 mol% of PEG 1,500.

A dry 4-liter ground four-neck flask which is equipped with a stirrer, a gas inlet tube, a thermometer and an ascending air condenser with a Liebig condenser attached on top is charged with 547.1 g of dimethyl terephthalate (DMT) (2.82 mol),
40.8 g of tripropenylsuccinic anhydride (0.18 mol),
167.4 g of monoethylene glycol (2.7 mol),
297.0 g of butane-1,4-diol (3.3 mol),
1,228.5 g of polyethylene glycol 1,500 (PEG 1,500) (0.819 mol) and
1.5 g of titanium tetraisopropylate.

The apparatus is evacuated and refilled with nitrogen. A slow stream of nitrogen is then passed over the flask contents as they are heated to 170° C. in the course of one hour. At about 130° C. all of the contents have melted. At as low a temperature as 100° C. the DMT begins to sublime. The stream of nitrogen is largely throttled back until all of the sublimed DMT has been washed back into the mixture by refluxing methanol. The further heating programme is as follows:
one hour at 170° C.
in the course of one hour to 180° C.
in the course of ½ hour to 190° C.
in the course of ½ hour to 200° C.
in the course of ½ hour to 208° C.
one hour at 208° C. (205°–210° C.).

A waterjet vacuum is then applied, and when about 20 mbar has been reached the heating is continued at 208° C. (205°–210° C.) for a further 10 minutes. The entire vacuum phase lasts about 30 minutes and an apparent mean molecular weight of 1,350–1,400 is reached. In total about 373 g of distillate are obtained, comprising methanol, water, dioxane, excess glycol and excess butane-1,4-diol. Left behind in the flask is 1,910 g of a highly mobile pale melt, which is immediately allowed to flow slowly, while still hot, into 5,730 g of distilled water at 20° C. with vigorous stirring. In the course of this addition the temperatue rises to about 47° C., and the result is an already fairly fine dispersion whose particles, even so, still predominantly have a diameter of 10–100μ. This dispersion is then heated to 70° C. and is vigorously stirred at this temperature for 3 hours. It is then allowed to cool down to room temperature while stirring. This gives 7,655 g of a very homogeneous slightly viscous 25% strength dispersion, about 95% of its particles having a mean diameter of 1μ. The dispersion can be stored without problems and can be readily diluted with water. Nor does it form a scum or sediment even on storage at 50° C.

The melting point of the undispersed polyester is 115°–135° C.

Shortening or lengthening the heating time of the polycondensation phase is an easy way of obtaining variations on this polyester with a higher or lower molecular weight, and the hydrophyling agent can thus be adpated to special requirements.

EXAMPLE 2

(100 mol% of DMT; 89 mol% of MEG; 61 mol% of hexane-1,6-diol; 13.65 mol% of PEG 1,000; and 13.65 mol% of PEG 2,000).

(a) Preparation of the polyester

In a 2-liter ground four-neck flask which is equipped analogously to Example 1, 291 g of DMT (1.5 mol), 82.8 g of monoethylene glycol (=1.335 mol), 108 g of hexane-1,6-diol (=0.915 mol), 204 g of PEG 1,000 (=0.20475 mol), 409.5 g of PEG 2,000 (=0.20475 mol) and 1 g of titanium tetraisopropylate, as catalyst, are melted at 130° C., are heated under nitrogen in the course of one hour to 170° C. and are then evenly raised in the course of 3 hours to the reaction temperature of 208° C. The resulting distillate consists chiefly of methanol and water. The mixture is stirred at 208° C. for a further hour and is then carefully subjected to the vacuum of a waterjet pump (danger of foaming). When 20 mbar have been reached after about 15 minutes, the condensation reaction is continued at 13–20 mbar for a further ½ hour. Besides further methanol and some dioxane the distillate coming off now also includes excess glycol. The yield obtained is 948 g of a pale melt which can be poured onto VA stainless steel trays and solidifies there on cooling into a white wax. The melting point of the polyester thus obtained is 90°–95° C., and its molecular weight is 1,600. The wax is broken into pieces and packed in this state.

(b) Preparation of the dispersion

In the absence of air, 100 g of the polyester obtained under (a) are melted and reheated to 208° C. The highly mobile melt is then immediately allowed to flow slowly, while still hot, into 600 g (=6 times the weight) of softened water at 15°–20° C. which is agitated by an Ultra-Turrax high-speed stirrer (10,000 r.p.m.). Agitation is continued until the temperature of the emulsion has reached 50° C., to obtain in this way 700 g of a homogeneous whitish highly mobile 14.3% strength emulsion which does not tend to gel or sediment even on prolonged storage at 50° C.

EXAMPLE 3

(94 mol% of DMT; 6 mol% of 2,4-dimethylheptenylsuccinic anhydride; 80 mol% of MEG; 120 mol% of propane-1,3-diol; and 10 mol% of PEG 2,000)

(a) Preparation of the polyester

In a 2-liter ground four-neck flask which is equipped analogously to Example 1, 273.5 g of DMT (1.41 mol), 20.3 g of 2,4-dimethylheptenylsuccinic anhydride (0.09 mol), 74.4 g of monoethylene glycol (1.2 mol), 136.8 g of propane-1,3-diol (1.8 mol), 300 g of PEG 2,000 (0.15 mol) and 1 g of titanium tetraisopropylate, as catalyst, are melted at 130° C., are heated under nitrogen in the course of one hour to 170° C. and are then evenly raised in the course of three hours to the reaction temperature of 208° C. The resulting distillate consists chiefly of methanol and water. The mixture is stirred at 208° C. for a further hour and is then carefully subjected to the vacuum of a waterjet pump (danger of foaming). When 20 mbar have been reached after about 15 minutes, the condensation reaction is continued at 13–20 mbar for a further ½ hour. Besides further methanol and some dioxane the distillate coming off now also includes excess glycol. The yield obtained is 632 g of a pale melt which can be poured onto VA stainless steel trays and solidifies there on cooling into a white wax. The melting point of the polyester thus obtained is 175°–185° C., and its molecular weight is 2,000. The wax is broken into pieces and packed in this state.

A polyester having very similar properties is obtained by replacing the 2,4-dimethylheptenylsuccinic anhydride used above by the same amount of 2,4-dimethylheptylsuccinic anhydride.

(b) Preparation of the dispersion 100 g of the polyester prepared under (a) are vigorously stirred overnight in the form of coarse lumps in a 1-liter flask together with 400 ml of water and, in time, disintegrate into a fine mud, which is poured into a 1-liter screw-top bottle. 10 g of an emulsifier based on oxyethylated benzylhydroxydiphenyl are added, and the flask is rinsed out with 190 ml of water (=a 14.3% strength standardisation). The bottle is then filled up almost completely (about 600 ml) with glass balls of 0.5 cm diameter, is screwed shut and is rolled for 2 days on a roll mill. The result is a very finely divided dispersion with particles which to more than 95% have a diameter of only 1μ (inspection under microscope). The balls are separated off in a simple manner by sieving. The dispersion thus obtained dose not tend to gel or sediment even on storage at 50° C.

EXAMPLE 4

(96 mol% of DMT; 4 mol% of octadecenylsuccinic anhydride; 115 mol% of monoethylene glycol; 135 mol% of butane-1,4-diol; 10 mol% of PEG 3,000=5% by weight of Emulsifier W)

(a) Preparation of an emulsifier-containing polyester of the invention

In a 2-liter ground four-neck flask which is equipped analogously to Example 1, 279.4 g of DMT (1.44 mol), 21.1 g of octadecenylsuccinic anhydride (0.06 mol), 74.4 g of monoethylene glycol (1.2 mol), 182.5 g of butane-1,4-diol (2.025 mol), 450 g of PEG 3,000 (0.15 mol) and 1 g of titanium tetrabutylate, are melted at 130° C., are heated with stirring under nitrogen in the course of one hour to 170° C. and are then evenly raised in the course of 3 hours to the reaction temperature of 208° C. The distillate chiefly consists of methanol and water. The mixture is stirred at 208° C. a further hour and is then carefully subjected to the vacuum of a waterjet pump (danger of foaming). When 20 mbar have been reached after about 15 minutes, the condensation reaction is continued at 13–20 mbar for a further ½ hour. Besides further methanol and some dioxane the distillate coming off now also includes excess glycol. This leaves 808 g of a pale melt which is admixed with 40.4 g of an emulsifier based on oxyethylated benzylhydroxydiphenyl (=5% by weight) and is then immediately poured onto a VA stainless steel tray. The mixture crystallises on cooling down to give 848.4 g of a white wax which has a melting point of about 160°–180° C. The apparent mean molecular weight of the polyester before the emulsifier is admixed is 2,000.

(b) Preparation of the dispersion 105 g of the above wax are vigorously stirred overnight in the form of coarse lumps in 395 ml of water in a 1-liter flask and in time disintegrate into a fine mud, which is poured into a 1-liter screw-top bottle, followed by 200 ml of water (=a 14.3% strength standardisation) used to rinse the flask. The bottle is then almost completely filled up with glass balls of 0.5 cm diameter (about 600 ml), is screwed shut and is rolled on a roll mill for two days. The result is a very finely divided dispersion with particles of which more than 95% have a diameter of only 1μ (inspection under microscope). The balls are separated off in a simple manner by sieving. The dispersion thus obtained does not tend to gel or sediment even on storage at 50° C.

EXAMPLE 5

95 mol% of DMT; 5 mol% of n-dodecenylsuccinic anhydride; 90 mol% of MEG; 60 mol% of butane-1,4-diol; 60 mol% of neopentylglycol; and 27.3 mol% of PEG 1,500

In a 2-liter ground four-neck flask which is equipped analogously to Example 1, 276.5 g of dimethyl terephthalate (1.425 mol), 20.1 g of n-dodecenylsuccinic anhydride (0.075 mol), 83.7 g of monoethylene glycol (1.35 mol), 81 g of butane-1,4-diol (0.9 mol), 93.6 g of neopentyl glycol (0.9 mol) and 614.3 g of PEG 1,500 (0.4095 mol) and 1 g of titanium tetraisobutylate, as transesterification catalyst, are melted at 130° C., are heated with stirring under nitrogen in the course of one hour to 170° C. and are then evenly raised in the course of 3 hours to the reaction temperature of 208° C. The distillate chiefly consists of methanol and water. The mixture is stirred at 208° C. for a further hour and is then carefully subjected to the vacuum of a waterjet pump (danger of foaming). When 20 mbar have been reached after about 15 minutes, the condensation reaction is continued at 13–20 mbar for a further ½ hour. Besides further methanol and some dioxane the distillate coming off now also includes excess glycol. The yield obtained is 962 g of a pale melt which is poured while still hot onto VA stainless steel trays and solidifies there over a few hours into a solid white wax, which is broken into small pieces and packed into a bottle for storage. The apparent mean molecular weight is 1,200.

A polyester having very similar properties is obtained by replacing the dodecenylsuccinic anhydride used above by the same amount of dodecylsuccinic anhydride.

EXAMPLE 6

94 mol% of DMT; 6 mol% of isononylsuccinic anhydride; 200 mol% of propane-1,3-diol; and 27.3 mol% of PEG 1,500

(a) Preparation of the polyester

In a 1-liter ground four-neck flask which is equipped analogously to Example 1, 273.5 g of dimethyl terephthalate (1.41 mol), 20.34 g of isononylsuccinic anhydride (0.09 mol), 614.3 g of PEG 1,500 (0.4095 mol) and 1 g of titanium tetraisopropylate are heated in the course of one hour to 170° C., in the course of a further hour to 190° C. and in the course of a third hour to 210° C. in order to give, for a start, maximum incorporation of the PEG 1,500. The mixture is then allowed to cool down to 150° C., and 228.3 g of propane-1,3-diol are added. The mixture is then heated up in the course of one hour to 170° C. and is evenly raised in the course of 3 hours to the condensation temperature of 208° C., all the time being efficiently stirred and having nitrogen passed through.

The resulting distillate consists chiefly of methanol and water. The mixture is stirred for a further hour at 208° C. and is then carefully subjected to the vacuum of a waterjet pump (danger of foaming). When 20 mbar have been reached about 15 minutes later, the condensation is continued at 13-20 mbar for a further ½ hour. Besides further methanol and some water excess propanediol is now distilled off, to leave behind 954 g of a pale melt which is preferably poured onto a VA stainless steel tray, where it is allowed to cool down to form a white wax, which is easily broken into small pieces. Molecular weight = 1,090.

A polyester having very similar properties is obtained by replacing the isononylsuccinic anhydride used above by the same amount of isononenylsuccinic anhydride.

(b) Preparation of the dispersion 30 g of the melt cake obtained under (a) were melted again, and the melt was heated to 210° C. and was then slowly poured into 180 ml of distilled water at room temperature with vigorous stirring. The white, milky liquid was then stirred for 5 minutes; mean particles size now 10–100μ. The liquid was then subjected at 40°–50° C. for 10 minutes to ultrasound from a 100-watt B 12 Branson Sonifier (=20,000 Hertz) ultrasonic instrument to give a true-to-type, white dispersion having an average particlee size of 1μ.

EXAMPLE 7

94 mol% of DMT; 6 mol% of 2,4-dimethylheptenylsuccinic anhydride; 90 mol% of MEG; 10 mol% of DEG; 95 mol% of butane-1,4-diol; and 27.3 mol% of PEG 1,500

A dry 4-liter ground four-neck flask which is equipped with a stirrer, a gas inlet tube, a thermometer and an ascending air condenser with a Liebig condenser attached on top is charged with 547.1 g of dimethyl terephthalate (DMT) (2.82 mol), 40.8 g of tripropylenesuccinic anhydride (0.18 mol), 167.4 g of monoethylene glycol (2.7 mol), 31.8 g of diethylene glycol (0.3 mol), 256.5 g of butane-1,4-diol (3.3 mol), 1,228.5 g of polyethylene glycol 1,500 (PEG 1,500) (0.819 mol) and 1.5 g of titanium tetraisopropylate.

The apparatus is evacuated and refilled with nitrogen. A slow stream of nitrogen is then passed over the flask contents as they are heated to 170° C. in the course of one hour. By about 130° C. all of the contents have melted. At as low a temperature as 100° C. the DMT begins to sublime. The stream of nitrogen is largely throttled back until all of the sublimed DMT has been washed back into the mixture by refluxing methanol. The further heating programme is as follows:
one hour at 170° C.
in the course of one hour to 180° C.
in the course of ½ hour to 190° C.
in the course of ½ hour to 200° C.
in the course of ½ hour to 208° C.
one hour at 208° C. (205°–210° C.).

A waterjet vacuum is then applied, and when about 15 mbar has been reached, after about 10 minutes, the heating is continued at 208° C. (205°–210° C.) for a further 20 minutes. The entire vacuum phase lasts about 30 minutes, and an apparent mean molecular weight of 1,350–1,400 is reached. In total about 348 g of distillate are obtained, comprising methanol, water, dioxane, excess glycol and excess butane-1,4-diol. Left behind in the flask is 1,925 g of a highly mobile pale melt, which is immediately allowed to flow slowly, while still hot, into 5,775 g of distilled water (=3 times the amount of the melt) at 20° C. with vigorous stirring. In the course of this addition the temperature rises to about 47° C., and the result is an already fairly fine dispersion whose particles predominantly have a diameter of 1–10μ. This dispersion is then heated to 70° C. and is vigorously stirred at this temperature for 2 hours. It is then allowed to cool down to room temperature while stirring. This gives 7,700 g of a very homogeneous 25% strength dispersion, 90% of its particles being virtually colloidally dissolved. They are no longer visible under the microscope. The remaining particles have a mean diameter of about 1μ. Specific density = 1.041.

Shortening or lengthening the heating time is an easy way of obtaining variations on this polyester with a higher or lower molecular weight, and the hydrophiling agent can thus be adpated to special requirements.

EXAMPLE 8

(a) The 14.3% by weight strength emulsion prepared in Example 1 is diluted with softened water to a solids content of 2% by weight and is applied to a texturized polyester fabric as follows:

The fabric is passed through the 2% by weight strength emulsion and squeezed to a liquor pick-up of about 60%, the effect being increased by repeating this process. The fabric is then dried at temperatures of up to 120° C. on a drying unit and is then heat-set at 150° C. for 60 seconds on a separate or the same unit.

(b) A commercially available competitive product was applied to the same fabric under the same conditions.

The test results are summarized in Table I.

EXAMPLE 9

The 14.3% by weight strength emulsion prepared in Examples 1 to 6 is used as follows in the exhaust method:

Dyed filaments, staple yarns and textile sheet-like structures made of polyester, polyamide or polyacrylonitrile are treated at the end of the dyeing process in the final rinse bath at 40° C. (pH 4–5) for 20 minutes with 5% (on weight of goods) of the 14.3% by weight strength emulsion of the invention. A customary hydro-extraction is followed by the drying and heat-setting of Example 7.

The application of the emulsion can also be combined with the dyeing process. In this case 5% of the 14.3% by weight strength emulsion of the invention are added to the dyebath and the dyeing is conventionally processed and finished at the boil (95°–98° C.) or under high-temperature (about 135° C.) conditions.

EXAMPLE 10

The 14.3% by weight strength emulsions prepared in Examples 1–6 are diluted with softened water to a solids content of 7% and are sprayed onto the hydrophobic fibre textile material to be aftertreated. The drying and the heat-setting are carried out as described in Example 8.

In the following tables the column numbers denote:
1: Wicking in accordance with DIN 53,924, in cm
2: Drop test
3: DIN 54,002 soil redeposition
4: AATCC 130 soil release
5: Antistatic properties (Tesa-O-meter)
I: untreated
II: treated with polyester of the invention

TABLE I

| | Results of Example 8 | | | | |
|---|---|---|---|---|---|
| | Initial effect | | | After 3 wash-dry cycles | |
| | 1 | 2 | 5 | 1 | 4 | 5 |
|---|---|---|---|---|---|---|
| (a) product of the invention | 7 cm | 4 s | $3 \times 10^4$ | 6.8 cm | 10 s | $4 \times 10^5$ |
| (b) competitive product | 4 cm | 8 s | $4 \times 10^5$ | 4.3 cm | 40 s | $5 \times 10^6$ |

The tests described above, on the various fibre materials, give the values shown in Table II below.

TABLE II

| | Results of various materials. | | | | | | | | |
|---|---|---|---|---|---|---|---|---|---|
| | Initial effect | | | | | | | | |
| | 1 | | 2 | | 3 | | 4 | | 5 | |
| | I | II | I | II | I | II | I | II | I | II |
| PES taffeta | 1.2 | 2.7 | 6 s | 200 | 1 | 4 | 1 | 4–5 | $8 \times 10^6$ | $5 \times 10^3$ |
| PA taffeta | 1.1 | 3.9 | 10 s | 0 s | 1 | 3–4 | 2 | 3–4 | | $5 \times 10^4$ |
| PAC fibre fabric | 3.2 | 5 | 12 s | 0 s | 1 | 3 | 1 | 3–4 | $2 \times 10^5$ | $10^3$ |
| | after 3 wash-dry cycles | | | | | | | | |
| | 1 | | 2 | | 3 | | 4 | | 5 | |
| | I | II | I | II | I | II | I | II | I | II |
| PES taffeta | 1.5 | 2.8 | 10 s | 60 s | 1 | 3–4 | 1 | 4 | $9 \times 10^9$ | $8 \times 10^8$ |
| PA taffeta | 1.3 | 3.8 | 10 s | 0 s | 1 | 3–4 | 2 | 4 | | $10^8$ |
| PAC fibre fabric | 3.5 | 6.3 | 5 s | 0 s | 1 | 3–4 | 2 | 4 | | $10^9$ |

What is claimed is:

1. A water-dispersible polyester having structural units of the formula

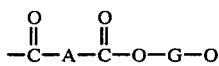

wherein
A is, on statistical average, 80 to 100 mol percent of p-phenylene and 0 to 20 mol percent of divalent moieties of the formula

and wherein
G is, on statistical average, 30 to 90 mol percent of linear or branched divalent alkane moieties having 3 to 6 carbon atoms which may be interrupted by 1 or 2 oxygen atoms, 10 to 30 mol percent of divalent polyether moieties having an average molecular weight of 1,000 to 3,000, and up to 50 mol percent of ethylene moieties, and
R is a straight-chain or branched alkyl or alkenyl having 6 to 18 carbon atoms.

2. A water-dispersible polyester according to claim 1, wherein
A is, on statistical average, 80 to 97 mol percent of p-phenylene and 3 to 20 mol percent of divalent moieties of the formula

and wherein
G is, on statistical average, 50 to 70 mol percent of linear or branched divalent alkane moieties having 3 to 6 carbon atoms which may be interrupted by 1 or 2 oxygen atoms, 10 to 30 mol percent of divalent polyether moieties having an average molecular weight of 1,000 to 3,000, and 20 to 40 mol percent of ethylene moieties.

3. A water-dispersible polyester according to claim 1 wherein A contains, on statistical average, 4 to 10 mol percent of said divalent moieties.

4. A water-dispersible polyester according to claim 1 wherein the alkane moiety of G is a straight-chain alkylene moiety having 3 to 6 carbon atoms.

5. A water-dispersible polyester according to claim 1 wherein R is a branched alkyl or alkenyl having 6–18 carbon atoms.

6. A water-dispersible polyester according to claim 5 wherein R is alkenyl having 6 to 18 carbon atoms.

7. A process for preparing the water-dispersible polyester of claim 1 which comprises reacting an acid mixture with a polyol mixture at temperatures of 100° to 280° C. wherein said acid mixture comprises 80–100 mol percent of terephthalic acid or precursor thereof and up to 20 mol percent of an alkylsuccinic acid of the formula

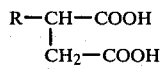

R—CH—COOH
|
CH₂—COOH or precursor thereof and said polyol mixture comprises
30 to 90 mol percent of a linear or branched alkanediol having 3 to 6 carbon atoms,
10 to 30 mol percent of a polyethylene glycol having a mean molecular weight of 1,000 to 3,000 and
up to 50 mol percent of ethylene glycol.

8. A process according to claim 7 wherein the molar amount of polyol mixture is up to a three-fold excess to the molar amount of said acid mixture.

9. An aqueous polyester dispersion comprising 5 to 33.33% by weight of a dispersible polyester according to claim 1 and 95 to 66.67% by weight of water.

10. An aqueous polyester dispersion according to claim 9 further containing up to 5% by weight of a nonionic emulsifier.

11. A method of imparting to hydrophobic textile materials a reduced tendency to static charge buildup, improved absorbency and reduced soiling tendency which comprises applying a water-dispersible polyester according to claim 1 to a hydrophobic textile material.

12. The method of claim 11 wherein the polyester is applied to the textile by spraying, pad-mangling or the exhaust method.

13. The method of claim 11 wherein the polyester is applied to the textile in the form of an aqueous dispersion containing 5 to 33.33% polyester by weight.

14. The method of claim 11 wherein the polyester is applied to the textile at a level of 0.3 to 1.5% by weight of textile substrate.

* * * * *